United States Patent
Liu

(10) Patent No.: US 8,723,485 B2
(45) Date of Patent: May 13, 2014

(54) POWER SUPPLY SYSTEM

(75) Inventor: Chien-Hung Liu, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 238 days.

(21) Appl. No.: 13/364,386

(22) Filed: Feb. 2, 2012

(65) Prior Publication Data

US 2013/0106386 A1 May 2, 2013

(30) Foreign Application Priority Data

Oct. 27, 2011 (TW) .............................. 100139196 A

(51) Int. Cl.
*H02M 3/07* (2006.01)

(52) U.S. Cl.
USPC .............................. 320/167; 307/110; 363/60

(58) Field of Classification Search
CPC ........................................................ H02M 3/07
USPC .......... 320/166, 167; 307/64, 110; 363/59, 60
See application file for complete search history.

(56) References Cited

U.S. PATENT DOCUMENTS

| | | | |
|---|---|---|---|
| 7,893,662 B2 * | 2/2011 | Ribellino et al. | 320/167 |
| 8,531,153 B2 * | 9/2013 | Baarman et al. | 320/108 |
| 2011/0062940 A1 * | 3/2011 | Shvartsman | 323/351 |
| 2012/0327660 A1 * | 12/2012 | Lin | 362/253 |

* cited by examiner

*Primary Examiner* — Harry Behm
*Assistant Examiner* — Matthew Grubb
(74) *Attorney, Agent, or Firm* — Rabin & Berdo, P.C.

(57) ABSTRACT

A power supply system includes an output node, an internal power supply unit, a boost storage unit, a charging path unit, and a discharging path unit. The output node is coupled to a load device. The internal power supply unit includes a gold capacitor unit for storing an internal storage voltage. The charging path unit is turned on in a charging period to store a boost supply voltage in the boost storage unit. The discharging path is turned on in a discharging period to provide a power signal for drive the load device according to the internal storage voltage and the boost supply voltage. The charging and discharging periods are non-overlapping.

11 Claims, 12 Drawing Sheets

POWER SUPPLY SYSTEM

POWER SUPPLY SYSTEM

This application claims the benefit of Taiwan application Serial No. 100139196, filed Oct. 27, 2011, the subject matter of which is incorporated herein by reference.

BACKGROUND OF THE INVENTION

1. Field of the Invention

The invention relates in general to a power supply system, and more particularly to a power supply system which supplies power by utilizing a gold capacitor and a boost storage unit.

2. Description of the Related Art

In a current information world where technologies change at an overwhelmingly fast pace, handheld devices, e.g. notebook computers, tablet computers and smart phones, prevail in the daily life as they offer indispensable conveniences. A handheld device is generally equipped with a chemical battery for powering the handheld device in the situation that power supply signals of market electricity are unavailable. It is worth mentioning that a common chemical battery has a lifespan of merely hundreds of times of charging/discharging processes. Therefore, as the number of times of charging processes increases, a storage efficiency of the chemical battery degrades to correspondingly shorten a power supply period offered by a seemingly fully charged chemical battery. In addition, a common chemical battery requires a rather long charging time (e.g. a few hours) to be fully charged.

In the view of the above drawbacks associated with the conventional power supply solution of chemical batteries, there is a need for an improved power supply solution for handheld devices.

SUMMARY OF THE INVENTION

The invention is directed to a power supply system for powering a load device. The power supply system includes: an internal power supply unit, including a gold capacitor unit for storing an internal storage voltage; a charging path unit, for providing the internal storage voltage to a boost storage unit in a charging period to have a boost supply voltage stored in the boost storage unit; and a discharging path unit, for serially connecting the boost storage unit and the gold capacitor unit between an output node and a reference voltage to provide a power signal for driving the load device according to the internal storage voltage and the boost supply voltage. In other words, the power supply system disclosed by the present invention supplies power through the gold capacitor and the boost storage unit. Thus, compared to the conventional power supply solution realized by chemical batteries, the power supply system disclosed by the present invention effectively eliminates various conveniences associated with chemical batteries.

According to an aspect the present invention, a power supply system for providing a power signal to a first load device is provided. The power supply system includes a first output node, a first internal power supply unit, a first boost storage unit, a first charging path unit, and a first discharging path unit. The first output node is coupled to the first load device. The first internal power supply unit includes a first gold capacitor and stores a first internal storage voltage. The first charging path unit is turned on in a first charging period to provide the first internal storage voltage to the first boost storage unit, so as to have a first boost supply voltage stored in the first boost storage unit. The first discharging path is turned on in a first discharging period to serially connect the first boost storage unit and the first gold capacitor between the first output node and the reference voltage, so as to provide a power signal for driving the first load device according to the first internal storage voltage and the first boost supply voltage. The first charging period and the first discharging period are non-overlapping.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

Figure 1:
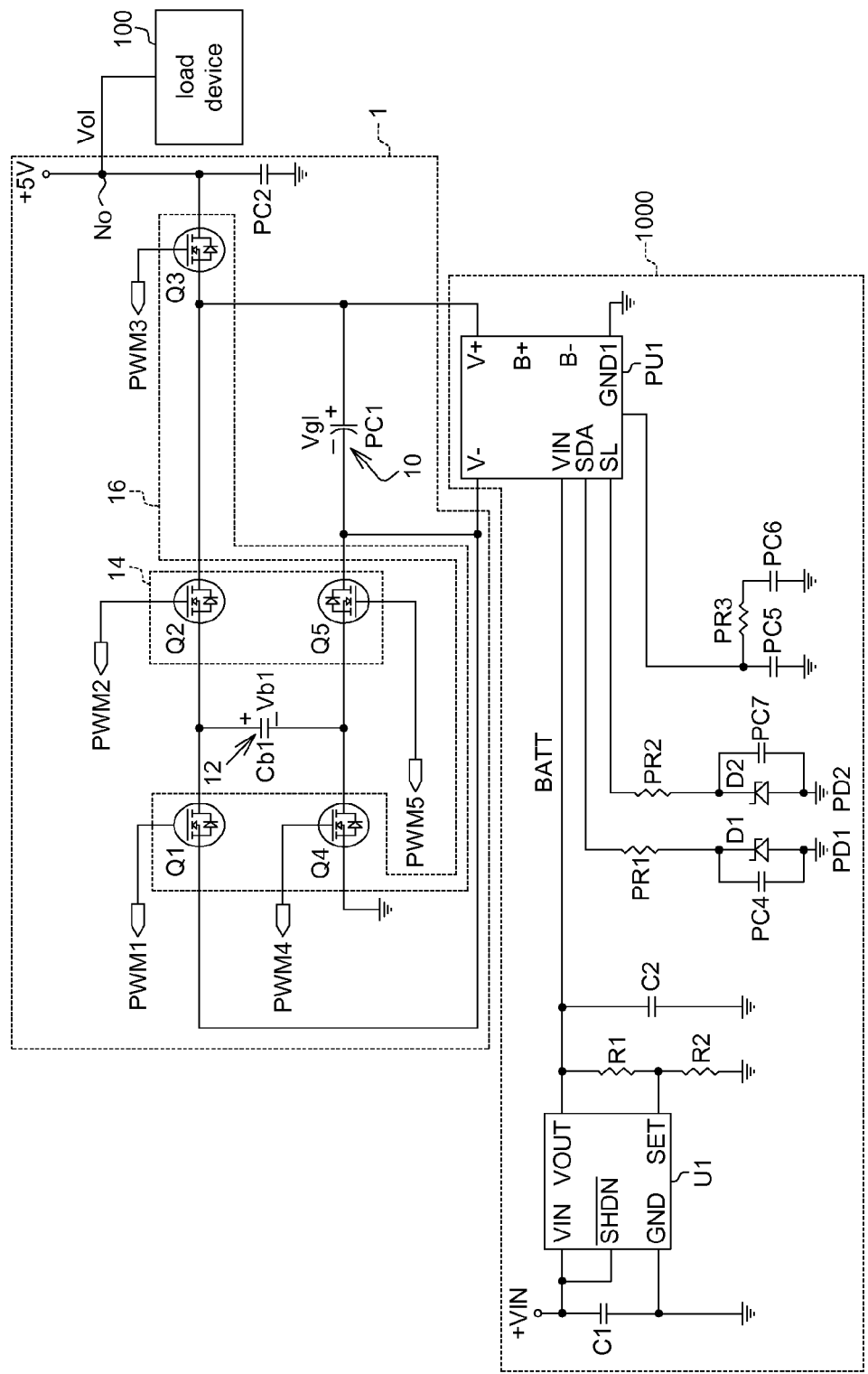
FIG. 1 is a block diagram of a power supply system according to a first embodiment of the present invention.

FIG. 1 shows a block diagram of a power supply system according to a first embodiment of the present invention. A power supply system 1 includes an output node No, an internal power supply unit 10, a boost storage unit 12, a charging path unit 14, and a discharging path unit 16. The power supply system 1 is coupled to a load device 100 via the output node No to provide a power signal Vo1 to the load device 100. The boost storage unit 12 is realized by a boost capacitor Cb1.

The internal power supply unit 10 includes a gold capacitor unit PC1 for storing an internal storage voltage Vg1. Further, the gold capacitor unit PC1 is driven by an external power circuit 1000 to store the internal storage voltage Vg1 therein. The external power circuit 1000 includes a charging unit U1 and a gas gauge integrated circuit PU1. The charging unit U1 provides an external supply voltage BATT. The gas gauge integrated circuit PU1, coupled to the internal charging unit 10, charges the gold capacitor unit CP1 that then has the internal storage voltage Vg1. For example, the gas gauge integrated circuit PU further measures the voltage and current of the gold capacitor CP1. For example, the external power circuit 1000 further includes resistors R1, R2, PR1, PR2 and PR3, capacitors C1, C2, PC4, PC7, PC5 and PC6, and Keener diodes D1 and D2, so as to bias the charging unit U1 and the gas gauge integrated circuit PU1.

The charging path unit 14 is turned on in a charging period to provide the internal storage voltage Vg1 to the boost capacitor Cb1, which then correspondingly stores a first energy and has its two ends corresponding to the boost supply voltage Vb1. Further, the charging path unit 14 includes switches Q2 and Q5 and is coupled to the boost capacitor Cb1 and the gold capacitor unit PC1. The switches Q2 and Q5 may be realized by transistors. In response to timing signals PWM2 and PWM5, the switches Q2 and Q5 are respectively turned on in the charging period to couple the gold capacitor unit PC1 to the boost capacitor Cb1. Thus, the boost capacitor Cb1 is charged by the internal storage voltage Vg1, so that the boost supply voltage Vb1 at the two ends of the boost capacitor Cb1 and the internal storage voltage Vg1 correspond to an approximate voltage level.

The discharging path unit 16 is turned on in a discharging period to serially connect the boost capacitor Cb1 and the gold capacitor unit PC1 between the output node No and a reference voltage (e.g., a ground reference voltage), so as to provide the power signal Vo1 for driving the load device 100. For example, the charging and discharging periods are non-overlapping.

Further, the discharging path unit 16 includes switches Q1, Q3 and Q4. The switches Q1 and Q4 respectively have their one end coupled to a positive input end and a negative input end of the boost capacitor Cb1, and their other end respectively coupled to one end of the switch Q3 and receiving the ground reference voltage. The switch Q3 has its other end coupled to the output node No. The switches Q1, Q3 and Q4 may be realized by transistors. In response to timing signals PWM1, PAM3 and PWM4, the switches Q1, Q3 and Q4 are respectively turned on in the discharging period to couple the gold capacitor unit PC1 and the boost capacitor Cb1 between the output node No and the ground reference voltage, so as to provide the power signal Vo1 for driving the load device 100 according to the internal storage voltage Vg1 and the boost supply voltage Vb1.

Figure 2:
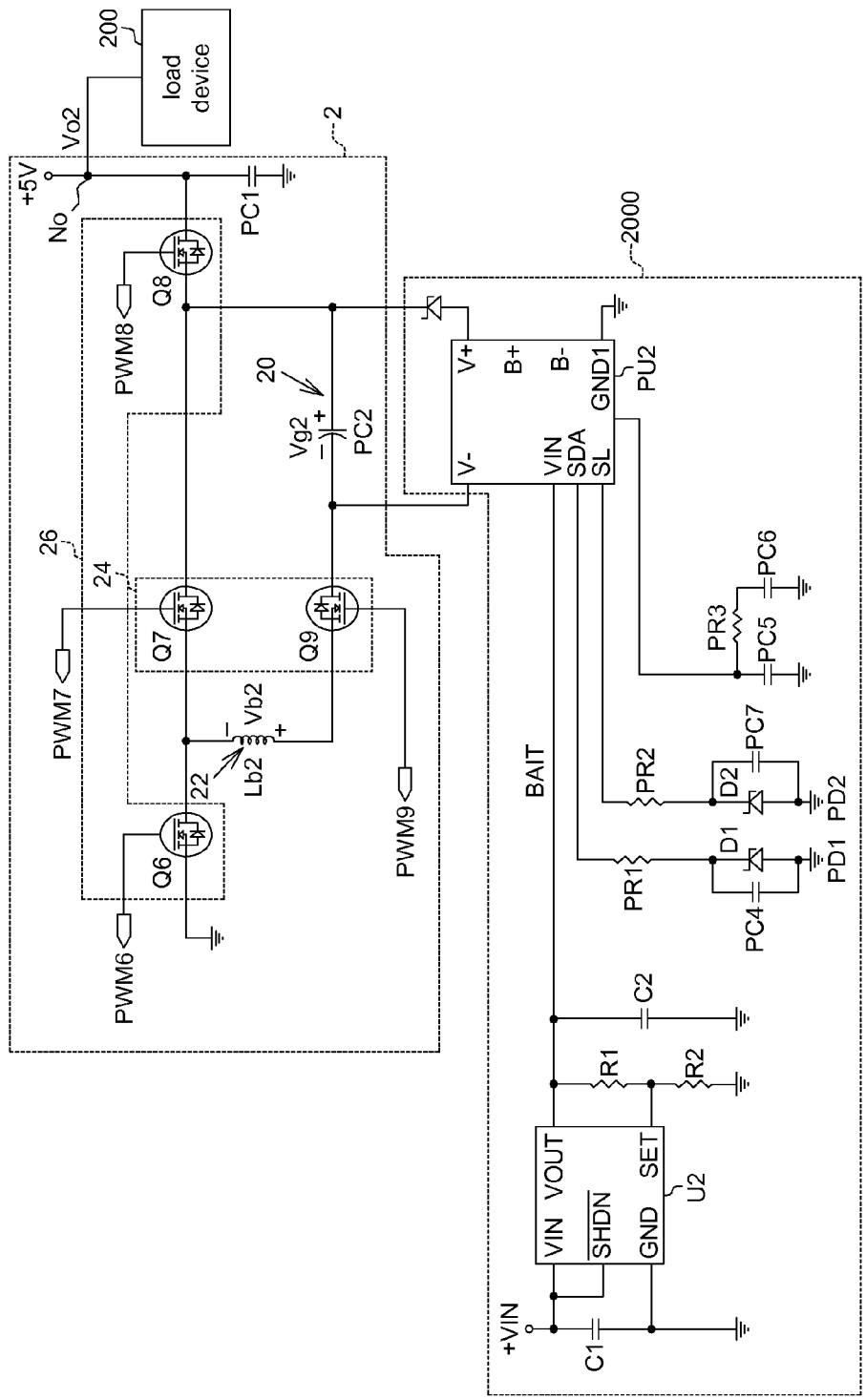
FIG. 2 is another block diagram of a power supply system according to a first embodiment of the present invention.

It should be noted that the boost capacitor Cb1 is taken as an illustrative example for realizing the boost storage unit 12 in this embodiment, rather than limiting the present invention thereto. Referring to FIG. 2 showing another example, a boost storage unit 22 may also be realized by a boost inductor, and a corresponding power supply system 2 may correspondingly provide a power signal Vo2 according to an internal storage voltage Vg2 at two ends of a gold capacitor unit PC2 and a supply voltage Vb2 at two ends of the boost inductor 22, as shown in FIG. 2.

Second Embodiment

A main difference between a power supply system according to a second embodiment and that according to the first embodiment is that, the power supply system according to the second embodiment further includes a number of sets of boost storage units, charging path units and discharging path units. Accordingly, power signals for driving a load unit are provided in a number of discharging periods to realize a power supply system that provides power signals of multiple phases.

Figure 3:
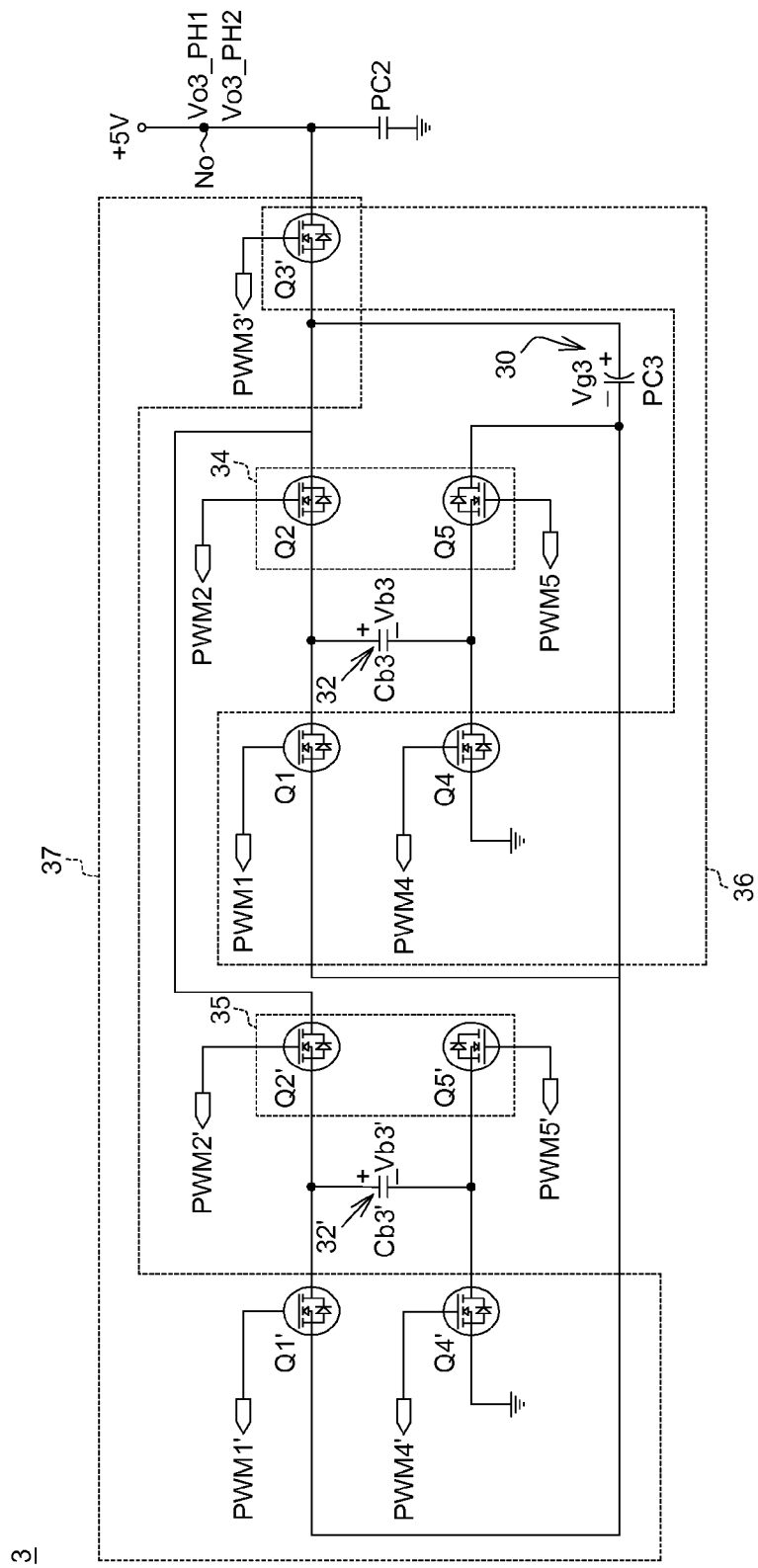
FIG. 3 is a schematic diagram showing a circuit of a power supply system according to a second embodiment of the present invention.

FIG. 3 shows a schematic diagram of a circuit of a power supply system according to the second embodiment of the present invention. A power supply system 3 includes charging path units 34 and 35, discharging path units 36 and 37, an internal power supply unit realized by a gold capacitor unit PC3, and two boost storage units 32 and 32' respectively realized by boost capacitors Cb3 and Cb3'. For example, operation details of the gold capacitor unit PC3, the boost capacitor Cb3, the charging path unit 34 and the discharging path 36 are similar to those of the corresponding units (i.e., the gold capacitor unit PC1, the boost capacitor Cb1, the charging path unit 14 and the discharging path unit 16). The boost capacitor Cb3 is charged in a first charging period to have a boost supply voltage Vb3 stored between the two ends of the boost capacitor Cb3. Further, in the first charging period, a power signal Vo3_PH1 is provided for driving a load device (not shown) according to an internal storage voltage Vg3 and the boost supply voltage Vb3.

The charging path unit 35 is turned on in a second charging period to provide the internal storage voltage Vg3 to the boost storage unit 32', so as to have the boost supply voltage Vb3' stored between the two ends of the boost storage unit 32'. Further, the charging path unit 35 includes switches Q2' and Q5'. The switches Q2' and Q5' are coupled to the boost capacitor Cb3' and the gold capacitor unit PC3, and may be realized by transistors. In response to timing signals PWM2' and PWM5', the switches Q2' and Q5' are respectively turned on in the charging period to couple the gold capacitor unit PC3 to the boost capacitor Cb3'. Thus, the boost capacitor Cb3' is charged according to the internal storage voltage Vg3, so that the boost supply voltage Vb3 at two ends of the boost capacitor Cb3' and the internal storage voltage Vg1 correspond to an approximate voltage level.

The discharging path unit 37 is turned on in a discharging period to serially connect the boost capacitor Cb3' and the gold capacitor unit PC3 between the output node No and a ground reference voltage, so as to provide a power signal Vo3_PH2 for driving the load device according to the internal storage voltage Vg3 and the boost supply voltage Vb3'. The second charging period and the second discharging period are non-overlapping. Further, the discharging path unit 37 includes switches Q1', Q3' and Q4'. The switches Q1' and Q4' respectively have their one end coupled to a positive input end and a negative input end of the boost capacitor Cb3', and their other end respectively coupled to one end of the switch Q3' and receiving the ground reference voltage. The switch Q3' has its other end coupled to the output node No. The switches Q1', Q3' and Q4' may be realized by transistors. In response to timing signals PWM1', PAM3' and PWM4', the switches Q1', Q3' and Q4' are respectively turned on in the second discharging period to couple the gold capacitor unit PC3 and the boost capacitor Cb3' between the output node No and the ground reference voltage, so as to provide the power signal Vo3_PH2 for driving a load device (not shown) according to the internal storage voltage Vg3 and the boost supply voltage Vb3'.

In an embodiment, the first discharging period and the second charging periods are triggered in a substantially same period; the second discharging period and the first charging period are triggered in a substantially same period. In other words, at the time when the discharging path unit 36 provides the power signal Vo3_PH1 for powering the load device according to the internal storage voltage Vg3 and the boost supply voltage Vb3, the charging path unit 35 simultaneously charges the boost capacitor Cb3' according to the internal storage voltage Vg3. At the time when the discharging path unit 36 provides the power signal Vo3_PH2 for powering the load device according to the internal storage voltage Vg3 and the boost supply voltage Vb3', the charging path unit 34 simultaneously charges the boost capacitor Cb3 according to the internal storage voltage Vg3. Accordingly, through to the time-sharing operations of the two sets of charging and discharging path units 34 and 36 as well as 35 and 37, the power supply system 3 according to the second embodiment is capable of correspondingly providing power signals Vo3_PH1 and Vo3_PH2 of two phases.

Figure 4:
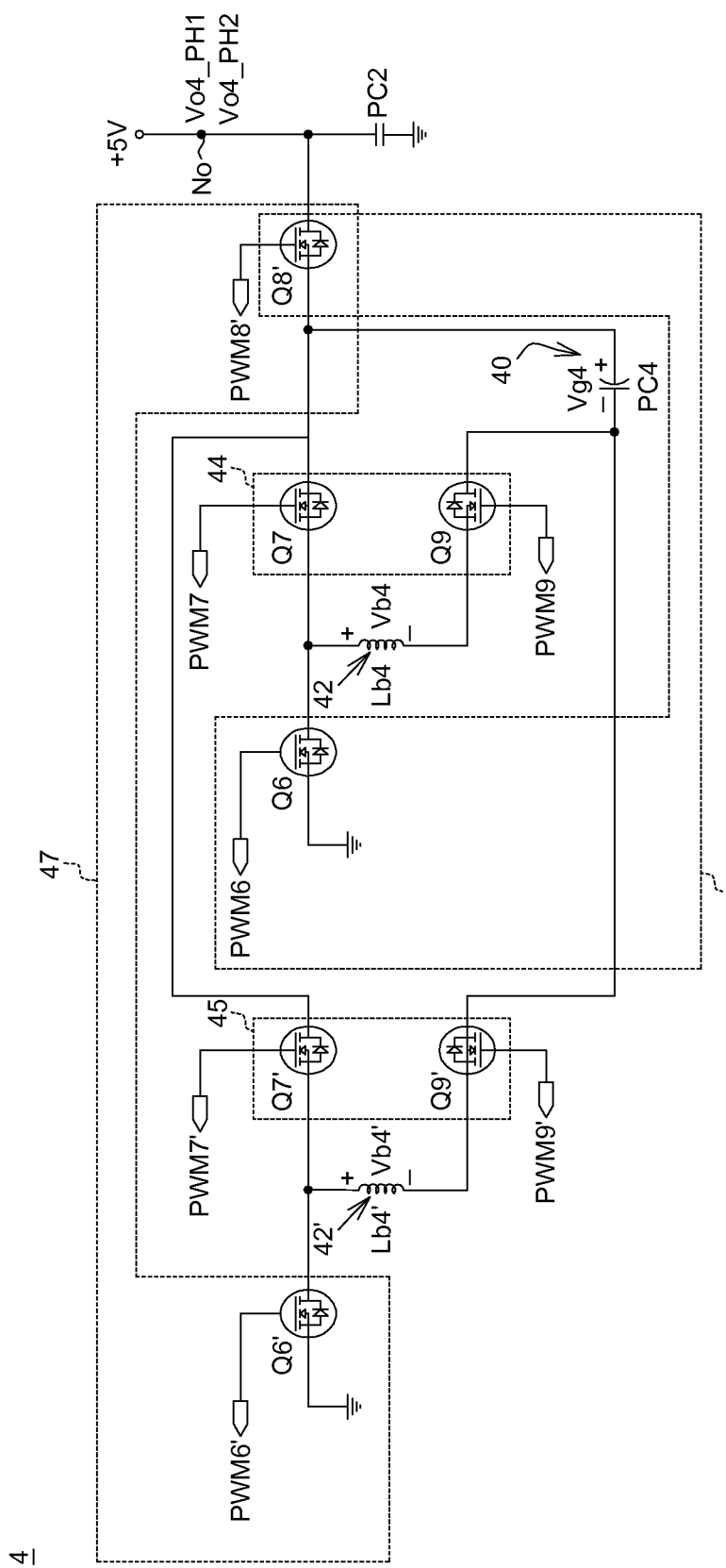
FIG. 4 is another block diagram of a power supply system according to a second embodiment of the present invention.

It should be noted that the boost capacitors Cb3 and Cb3' are taken as an illustrative example for respectively realizing the boost storage units 32 and 32' in this embodiment, rather than limiting the present invention thereto. Referring to FIG. 4 showing another embodiment, boost storage units 42 and 42' may also be realized by boost inductors Lb4 and Lb4', and a corresponding power supply system 4 may correspondingly provide a power signal Vo2_PH1 according to an internal storage voltage Vg4 at two ends of a gold capacitor unit PC4 and a supply voltage Vb4 at two ends of the boost inductor Lb4, and also provide a power signal Vo2_PH2 according to an internal storage voltage Vg4 at two ends of the gold capacitor unit PC4 and a supply voltage Vb4' at two ends of the boost inductor Lb4', as shown in FIG. 4.

In this embodiment, although examples of the power supply systems 3 and 4 including two sets of boost storing units, charging path units and discharging path units for correspondingly provide two power signals are given, it should noted that the examples are merely for illustrative purposes. In other embodiments, the power supply system according to this embodiment may also include three or more than three sets of boost storage unit, charging path units and discharging path units, and, by functioning with corresponding timing controls, is capable of correspondingly providing power signals of three phases or more than three phases.

Third Embodiment

A main difference between a power supply system according to a third embodiment and the power supply system according to the first embodiment is that, the power supply system according to the third embodiment further includes a sub internal power supply unit, a sub boost storage unit, a sub charging path unit and a sub discharging path unit for determining a level of a reference voltage.

Figure 5:
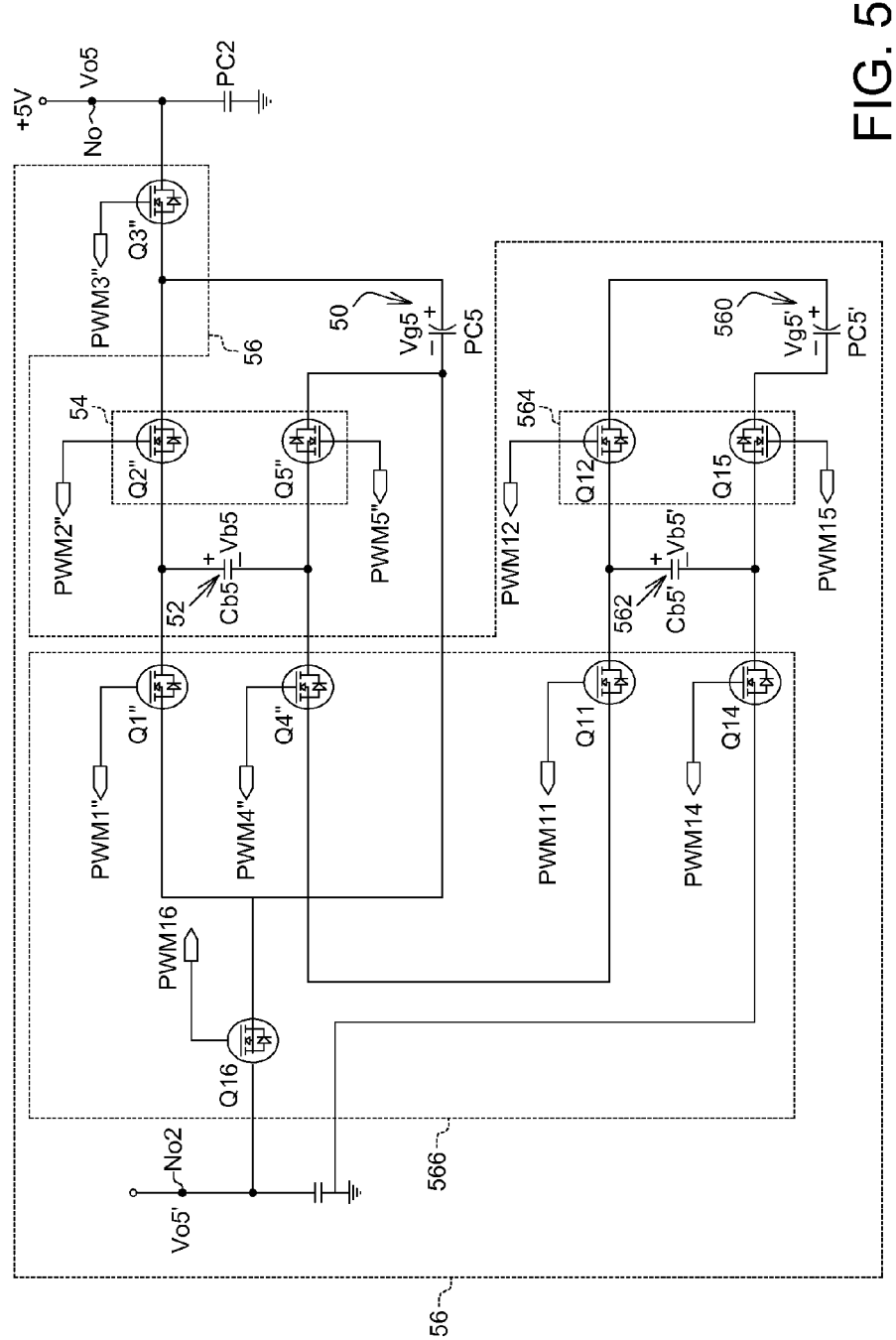
FIG. 5 is a schematic diagram showing a circuit of a power supply system according to a third embodiment of the present invention.

FIG. 5 shows a schematic diagram of a circuit of a power supply system according to the third embodiment of the present invention. A power supply system 5 includes an output node, an internal power supply unit 50 including a gold capacitor unit PC, a boost storage unit 52 realized by a boost capacitor Cb5, a charging path unit 54, and a discharging path unit 56. Operation details of the gold capacitor unit PC5, the boost capacitor Cb5 and the charging path unit 54 are similar to those of the corresponding units (i.e., the gold capacitor unit PC1, the boost capacitor Cb1 and the charging path unit 14) in FIG. 1. The boost capacitor Cb5 is charged in a charging period to have a boost supply voltage Vb5 stored between the two ends of the boost capacitor Cb5.

The main difference between the power supply system 5 in this embodiment and the power supply system 1 in the first embodiment is that, the charging path unit 56 further includes an output node No2, a sub internal power supply unit 560, a sub boost storage unit 562, a sub charging path unit 564, and a sub discharging path unit 566. The output node No2 has a reference voltage Vo6. The sub internal power supply unit 560 includes a sub gold capacitor PC5' for storing a sub storage voltage Vg5'. The sub boost storing unit is realized by a boost capacitor Cb5'.

The sub charging path unit 564 is turned on in the charging period to provide the sub internal storage voltage Vg5' to the sub boost storage unit 562, so as to store a sub energy into the sub boost storage unit 562, and to have a sub boost supply voltage Vb5' stored in the two ends of the sub boost storage unit 562. The sub charging path unit 564 further includes switches Q12 and Q15. The switches Q12 and Q15 are coupled to the sub boost capacitor Cb5' and the sub gold capacitor unit PC5', and may be realized by transistors. In response to timing signals PWM12 and PWM15, the switches Q12 and Q15 are respectively turned on in the charging period to couple the sub gold capacitor unit PC5' to the sub boost capacitor Cb5'. Thus, the sub boost capacitor Cb5' is charged according to the internal storage voltage Vg5', so that the sub boost supply voltage Vb5' at the two ends of the sub boost capacitor Cb5' and the internal storage voltage Vg5' correspond to an approximate voltage level.

The sub discharging path unit 566 is turned on in a discharging period to serially connect the sub boost capacitor Cb5' and the boost capacitor Cb5 between the output node No2 and a ground reference voltage VSS, so as to determine a level of the reference voltage Vo5' according to the internal storage voltage Vg5' and the sub boost supply voltage Vb5'. Further, the sub discharging path unit 566 includes switches Q1", Q4", Q11, Q14 and Q16. The switches Q1" and Q4" have their one end respectively coupled to a positive input end and a negative input end of the boost capacitor Cb5, and their other end respectively coupled to one end of the switches Q16 and Q11. The switches Q16 and Q11 have their other end respectively coupled to the output node No2 and a positive input end of the sub boost capacitor Cb5'. The switch 14 has its two ends respectively coupled to a negative input end of the sub boost capacitor Cb5' and receiving the ground reference voltage. The switches Q1", Q4", Q11, Q14 and Q16 may be realized by transistors.

In response to timing signals PWM1", PWM4", PWM11, PWM14 and PWM16, the switches Q1", Q4", Q11, Q14 and Q16 are respectively turned on in the discharging period to serially connect the sub boost capacitor Cb5' and the boost capacitor Cb5 between the output node No2 and the ground reference voltage, so as to provide the reference voltage Vo5' according to the sub boost supply voltage Vb5' and the boost supply voltage Vb5.

In an embodiment, the output node No2 is further coupled to a second load device (not shown) to drive the second load according to a reference voltage Vo6.

Fourth Embodiment

A main difference between a power supply system according to a fourth embodiment and the power supply system according to the first embodiment is that, the internal power supply unit of the power supply system according to the fourth embodiment further includes a boost/buck unit, which charges the boost storage unit in response to the internal storage voltage stored in the gold capacitor unit.

Figure 6:
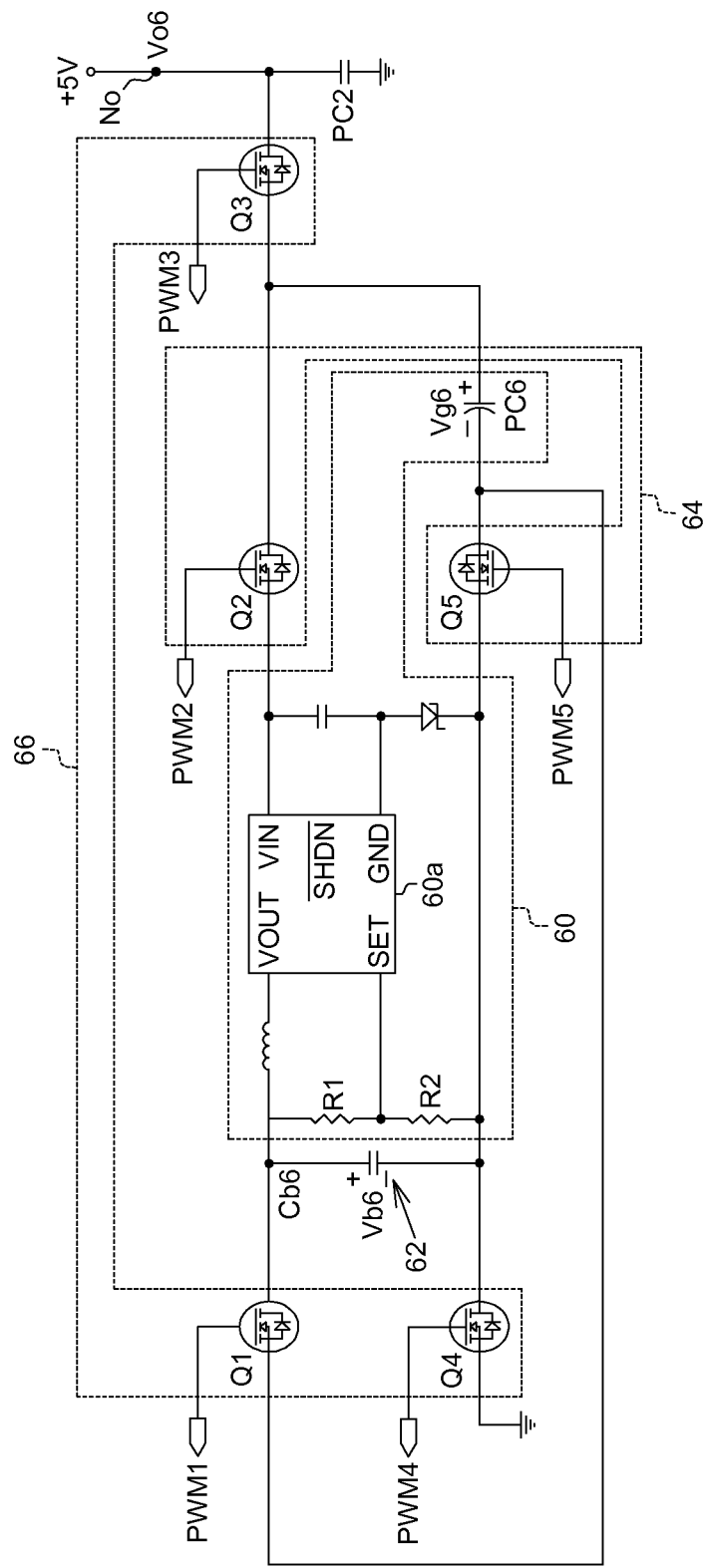
FIG. 6 is a schematic diagram showing a circuit of a power supply system according to a fourth embodiment of the present invention.

FIG. 6 shows a schematic diagram of a circuit of a power supply system according to the fourth embodiment of the present invention. The main difference between a power supply system 6 in this embodiment and the power supply system 1 in the first embodiment is that, an internal power supply unit 60 in the power supply system 1 further includes a boost/buck unit 60a. The boost/buck unit 60a receives an internal storage voltage Vg6 stored in a gold capacitor unit PC6 to charge a boost storage unit 62 (realized by a boost capacitor Cb6), so as to allow the boost capacitor Cb6 to store corresponding energy and to have the boost supply voltage Vb6 stored between the two ends of the boost storage unit 62. For example, the boost/buck unit 60a may be realized by a linear regulator (LDO) or a buck converter.

In the power supply system 6 according to this embodiment, by providing the boost/buck unit 60a in the internal power supply unit 60, the voltage of the boost supply voltage Vb6 of the boost capacitor Cb6 may be more precisely controlled.

Figure 7:
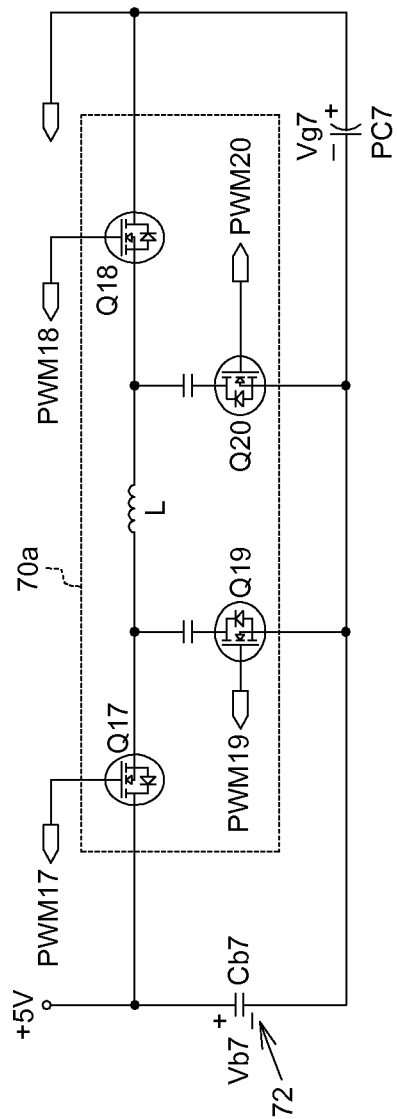
FIG. 7 is a schematic diagram showing a circuit of an internal power supply unit 70 according to a fourth embodiment of the present invention.

FIG. 7 shows a schematic diagram of a circuit of an internal power supply unit 70 according to the fourth embodiment of the present invention. In another example, a boost/buck unit 70a in the internal power supply unit 70 may be realized by transistors Q17, Q18, Q19 and Q20 and an inductor L. By switching the transistors Q17 to Q20, the boost/buck unit 70a is enabled to correspondingly function as a boost converter or a buck converter.

When an internal storage voltage Vg7 at two ends of a gold capacitor unit PC7 is higher than the boost supply voltage Vb7 required at two ends of the boost capacitor Cb7, the transistor Q19 is turned off while the transistors Q17, Q18 and Q20 as well as the inductor L enter a switch mode. The switch mode is operated in two time phases. In the first phase, the transistors Q17 and Q18 are turned on, and a current is flown into the inductor L and converted to electromagnetic energy that is stored in the inductor L. In the second phase, the transistors Q17 and Q20 are turned on, and the electromagnetic energy previously stored to the inductor L is converted to a current that is flown out. The two phases are repeatedly alternated to provide power supply. Accordingly, the boost/buck unit 70a renders functions of a buck converter for buck converting the internal storage voltage Vg7. The level of the boost capacitor Cb7 is then determined according to the buck converted boost supply voltage Vb7.

When the internal storage voltage Vg7 at the two ends of the gold capacitor unit PC7 is lower than the boost supply voltage Vb7 required at the two ends of the boost capacitor Cb7, the transistor Q20 is turned off while the transistors Q17, Q18 and Q19 as well as the inductor L enter the switch mode. The switch mode is operated in two time phases. In the first phase, the transistors Q18 and Q19 are turned on, and a current is flown into the inductor L and converted to electromagnetic energy that is stored in the inductor L. In the second phase, the transistors Q17 and Q18 are turned on, and the electromagnetic energy previously stored to the inductor L is converted to a current that is flown out. The two phases are repeatedly alternated to provide power supply. Accordingly, the boost/buck unit 70a renders functions of a boost converter for boost converting the internal storage voltage Vg7. The level of the boost capacitor Cb7 is then determined according to the boost converted boost supply voltage Vb7.

When the internal storage voltage Vg7 at the two ends of the gold capacitor unit PC7 equals the boost supply voltage Vb7 required at the two ends of the boost capacitor Cb7, the transistors 19 and 20 are turned off while the transistors Q17 and Q18 are turned on. Accordingly, the boost/buck unit 70a functions as neither a boost converter nor a buck converter, and the internal storage voltage Vg7 is directly provided to the boost capacitor Cb7.

In an actual application, the power supply systems 1 to 6 according to the above embodiments may be applied in a handheld device (e.g., a notebook computer) to power the handheld device. For example, an embedded controller of the notebook computer serves as a control device for the power supply systems 1 to 6 to correspondingly provide timing signals pwm1 to pwm20, pwm1' to pwm9', and pwm1" to pwm5" for timing control.

In an actual application, a handheld device may be concurrently allocated with a number of power supply systems. The power supply systems are for powering several processing core circuits (e.g., central processors, integrated circuits of north-south bridges in a motherboard and RAMs) and peripheral circuits, as shown in FIG. 8.

Figure 8:
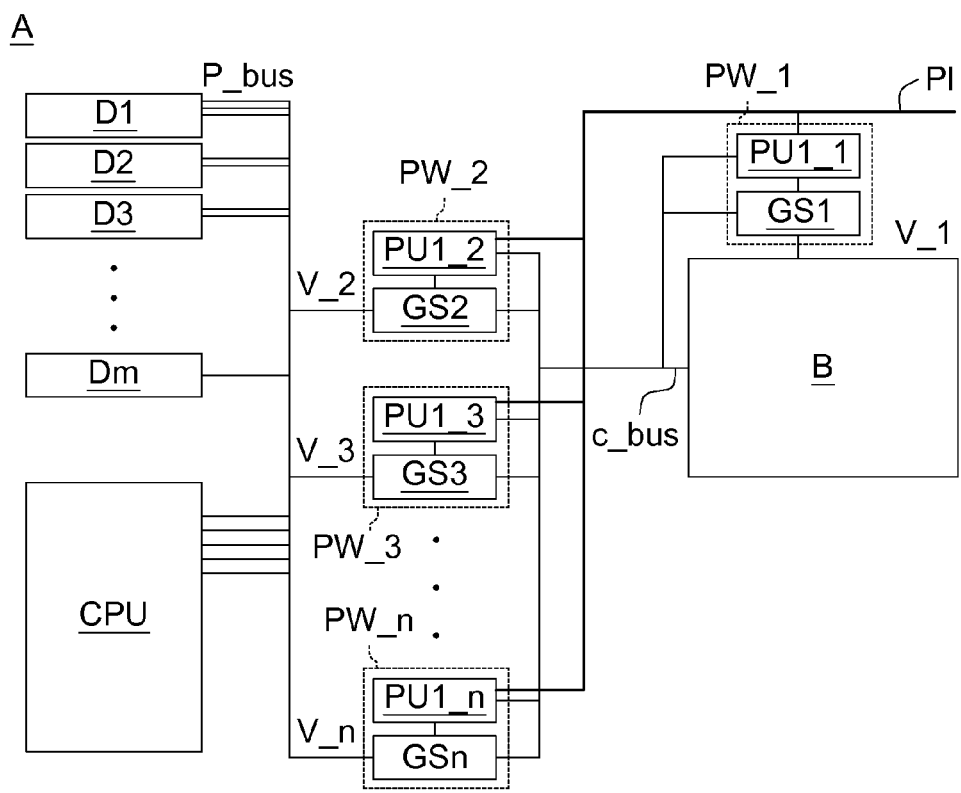
FIG. 8 is a block diagram of a handheld electronic device according to an embodiment of the present invention.

In the application example shown in FIG. 8, a handheld device A is allocated with a number of power supply units PW_1, PW_2, . . . , PW_n, which correspondingly provide n sets of supply voltages V_1, V_2, . . . , V_n via a power bus P_bus to respectively power devices D1, D2, . . . , Dm and a central processor CPU requiring power of different levels in the handheld device A, where n and m are natural numbers greater than 1. For example, the power supply units PW_1 to PW_n may be realized by the power supply systems described in the first to fourth embodiments. Further, the power supply units PW_1 to PW_n respectively include gas gauge integrated circuits PU1_1 to PU_1_n and switches GS_1 to GS_n. For example, the gas gauge integrated circuits PU1_1 to PU_1_n include the circuit of the gas gauge integrated circuit PU_1 shown in FIG. 1, which receives the external supply voltage BATT via an external power supply path P1. For example, the switches GS_1 to GS_n are realized by corresponding charging path units and discharging path units. The gas gauge integrated circuits PU1_1 to PU_1_n and the switches GS_1 to GS_n are further coupled to an embedded controller B via a control bus C_bus, and thus operate correspondingly under the control of the embedded controller.

In an actual application, the embedded controller B in the handheld device A is connected to the various power supply units PW_1 to PW_n via the control bus C_bus to control corresponding operations of the power supply units PW_1 to PW_n. FIGS. 9A to 9D show a flowchart of a process performed on the power supply system by the embedded controller B according to this embodiment.

The embedded controller B performs steps of: a) detecting the external supply voltage BATT; b) detecting the internal storage voltage Vg1; c) performing digital-to-analog conversion; d) looking up a table; e) detecting temperature/current; f) transmitting data; g) considering overall factors; and h) indicating an error. In Step (a), the embedded controller B detects whether the external supply voltage BATT is received, and performs Step (b) if a result is affirmative. In Steps (b) to (d), the embedded controller B samples, digital-to-analog converts and looks up a table with respect to the internal storage voltage Vg1 to identify an original value of the internal storage voltage Vg1. In Step (e), the embedded controller B drives the gas gauge integrated circuit PU1 to determine temperature and current parameters of the gold capacitor unit PC1. In Steps (f) and (g), the embedded controller B respectively receives the internal storage voltage Vg1 as well as the temperature and current parameters, and determines whether to charge the gold capacitor unit PC1 by considering overall factors on the voltage, current and temperature parameters. In the event that an operation failure occurs in the Steps (a) to (g), the embedded controller B skips to Step (h) to send out an error message.

Figure 9A:
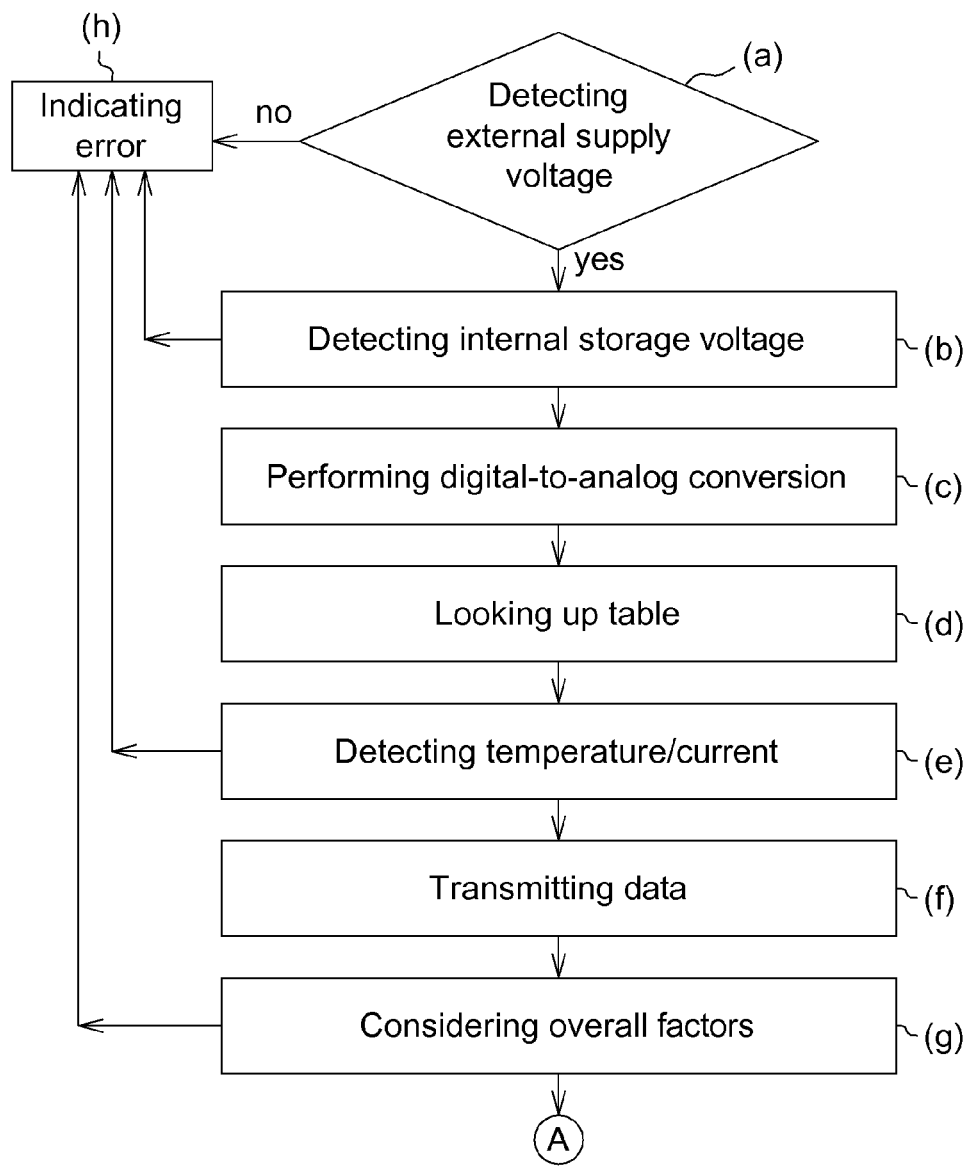
FIGS. 9A to 9D are flowcharts of an embedded controller B.
Figure 9B:
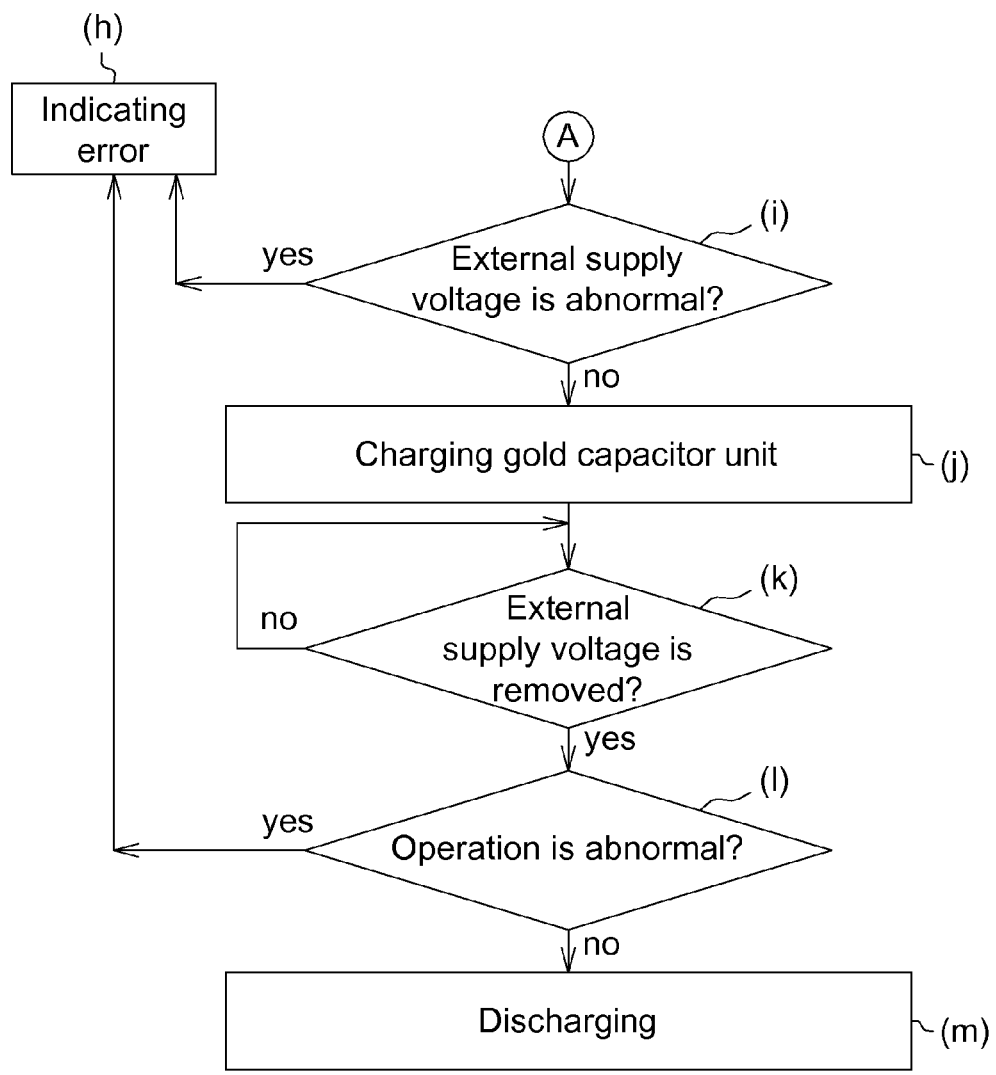

Referring to FIG. 9B, after it is determined the gold capacitor unit PC1 is to be charged, Step (i) is performed in which the embedded controller B charges the gold capacitor unit PC1 via the external power circuit 1000. In Step (j), a program executed by the embedded controller B enters a self-refresh mode, and the embedded controller B determines whether the external supply voltage BATT is abnormal. The embedded controller B performs Step (h) when the external supply voltage BATT is abnormal, or else it performs Step (j) to continue charging the gold capacitor unit PC1 until the gold capacitor unit PC1 is fully charged. In Step (k), the embedded controller B determines whether the external supply voltage BATT is removed. Step (k) is iterated when a result from Step (k) is affirmative, or else the embedded controller B performs Step (l) to enter an economic (ECO) mode when the result from Step (k) is negative, and determines whether the operation of the gold capacitor unit PC1 is abnormal. The embedded controller B enters Step (h) when a result from Step (l) is affirmative, or else it performs Step (m) when the result from Step (l) is negative to discharge the gold capacitor unit PC1 until the gold capacitor unit PC1 is completely discharged.

Figure 9C:
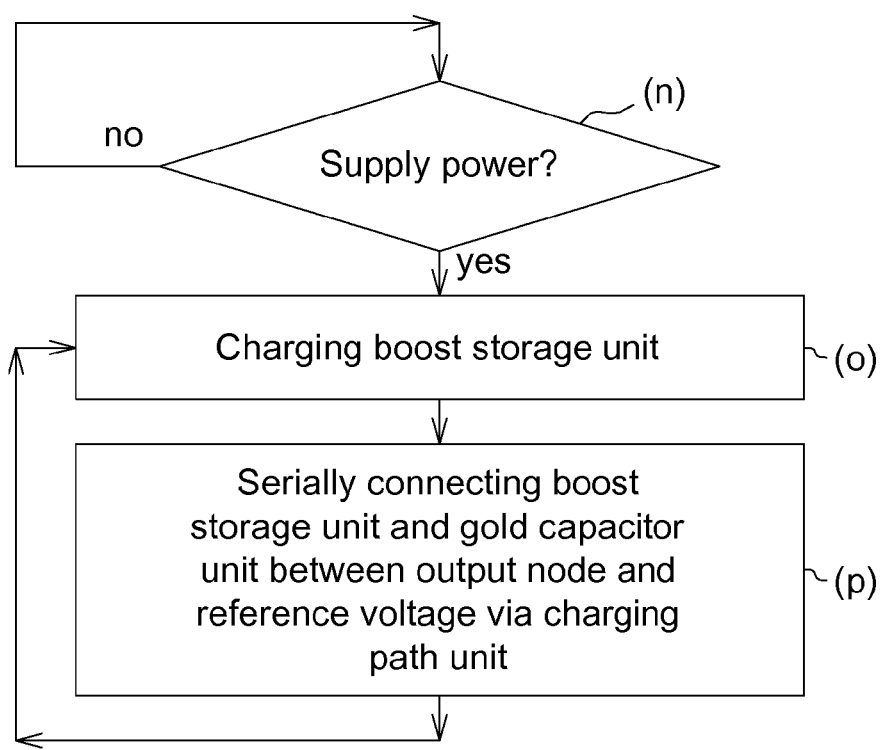

Referring to FIG. 9C, the embedded controller B performs Steps (n), (o) and (p) under conditions of the first to third embodiments. In Step (n), the embedded controller B determines whether to supply power by the gold capacitor unit PC1 via the gas gauge integrated circuit PU1. Step (n) is iterated when a result is negative, or else the Step (o) is performed when the result is affirmative. In Step (o), the embedded controller B drives the charging path unit 14 to charge the boost capacitor Cb1 through the gold capacitor unit PC1. In Step (p), via the charging path unit 16, the embedded controller B serially connects the boost capacitor Cb1 and the gold capacitor unit PC1 between the output node No and the reference voltage to power a corresponding device.

Figure 9D:
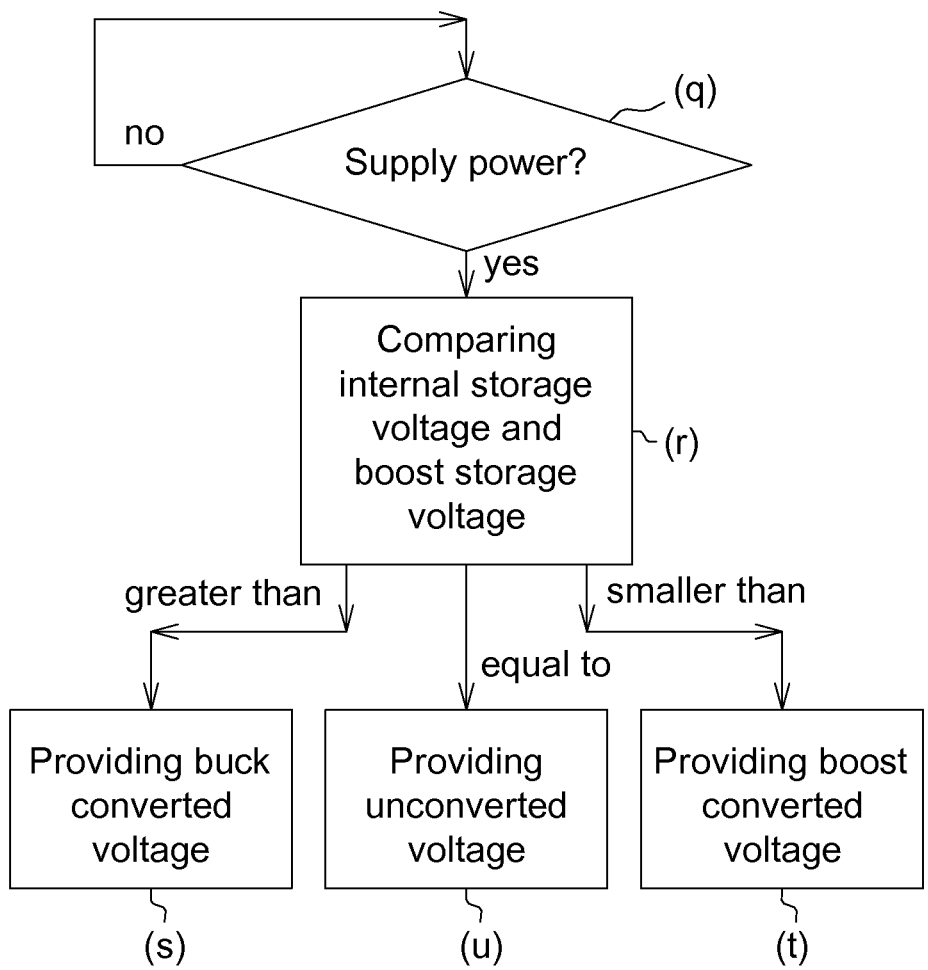

Referring to FIG. 9D, under conditions of the fourth embodiment, the embedded controller B performs Steps (q), (r), (s), (t) and (u). In Step (q), the embedded controller B determines whether to supply power by the gold capacitor unit PC1 via the gas gauge integrated circuit PU1. Step (q) is iterated when a result is negative, or else the Step (r) is performed when the result is affirmative. In Step (r), the embedded controller B compares the internal storage voltage Vg6 and the boost supply voltage Vb6. When the internal storage voltage Vg6 at the two ends of the gold capacitor unit PC6 is higher than the boost supply voltage Vb6 required at the two ends of the boost capacitor Cb6, the embedded controller B performs Step (s), in which the embedded controller B performs buck conversion by controlling the boost/buck unit 60a, so as to charge the boost capacitor Cb6 according to the buck converted internal storage voltage Vg6.

When the internal storage voltage Vg6 at the two ends of the gold capacitor unit PC6 is lower than the boost supply voltage Vb6 required at the two ends of the boost capacitor Cb6, the embedded controller B performs Step (t), in which the embedded controller B performs boost conversion by controlling the boost/buck unit 60a, so as to charge the boost capacitor Cb6 according to the boost converted internal storage voltage Vg6.

When the internal storage voltage Vg6 at the two ends of the gold capacitor unit PC6 equals the boost supply voltage Vb6 required at the two ends of the boost capacitor Cb6, the embedded controller B performs Step (u), in which the embedded controller B disables functions of boost conversion and buck conversion of the boost/buck unit 60a to directly provide the internal storage voltage Vg6 to the boost capacitor Cb6.

Therefore, the power supply system according to the above embodiments of the present invention includes: an internal power supply unit, including a gold capacitor unit for storing an internal storage voltage; a charge path unit, for providing the internal storage voltage to a boost storage unit in a charging period to have a boost supply voltage stored in the boost storage unit; and a discharging path unit, for serially connecting the boost storage unit and the gold capacitor unit between an output node and a reference voltage to provide a power signal for driving the load device according to the internal storage voltage and the boost supply voltage. In other words, the power supply system disclosed by the present invention supplies power through the gold capacitor and the boost storage unit. Thus, compared to the conventional power supply solution realized by chemical batteries, the power supply system disclosed by the present invention effectively eliminates various conveniences associated with chemical batteries.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply system, for providing a power signal to a first load device, comprising:
    a first output node, coupled to the first load device;
    a first internal power supply unit, comprising:
    a first gold capacitor unit, for storing a first internal storage voltage;
    a first boost storage unit;
    a first charging path unit, being turned on in a first charging period for providing the first internal storage voltage to the first boost storage unit, which correspondingly stores a first boost supply voltage;
    a first discharging path unit, being turned on in a first discharging period for serially connecting the first boost storage unit and the first gold capacitor unit between the first output node and a reference voltage, to provide the power signal for driving the first load device according to the first internal storage voltage and the first boost supply voltage, wherein
    the first charging period and the first discharging period are non-overlapping and
    a boost/buck unit, for receiving the first internal storage voltage and accordingly charging the first boost storage unit, which correspondingly stores the first boost supply voltage.

2. The power supply system according to claim 1, wherein the first charging path unit comprises:
    a first set of switches, coupled to the first boost storage unit and the first gold capacitor unit, the first set of switches turned on in the first charging period in response to a first set of timing signals, to couple the first gold capacitor unit to the first boost storage unit and charge the first boost storage unit according to the first internal storage voltage.

3. The power supply system according to claim 1, wherein the first discharging path unit comprises:
    a second set of switches, coupled to the first gold capacitor unit, the first boost storage unit, the reference voltage and the first output node, the second set of switches turned on in the first discharging period in response to a second set of timing signals, to serially connect the first capacitor unit and the first boost storage unit between the first output node and the reference voltage.

4. The power supply system according to claim 1, further comprising:
    a second boost storage unit;
    a second charging path unit, turned on in a second charging period for providing the first internal storage voltage to the second boost storage unit, which correspondingly stores a second boost supply voltage; and
    a second discharging path unit, turned on in a second discharging period for serially connecting the second boost storage unit and the first gold capacitor unit between the first output node and the reference voltage, to provide the power signal for driving the first load device according to the first internal storage voltage and the second boost supply voltage;
    wherein, the second charging period and the second discharging period are non-overlapping.

5. The power supply system according to claim 4, wherein the second charging path unit comprises:
a third set of switches, coupled to the second boost storage unit and the first gold capacitor unit, the third set of switches turned on in the second charging period in response to a second set of timing signals, to serially connect the first capacitor unit to the second boost storage unit and to charge the second boost storage unit according to the first internal storage voltage.

6. The power supply system according to claim 4, wherein the second discharging path unit comprises:
a fourth set of switches, coupled to the first gold capacitor unit, the second boost storage unit, the reference voltage and the first output node, being turned on in the second discharging period in response to a second set of timing signals, to serially connect the first gold capacitor unit and the second boost storage unit between the first output node and the reference voltage.

7. The power supply system according to claim 1, further comprising:
a third boost storage unit;
a third charging path unit, turned on in a third charging period for providing the first internal storage voltage to the third boost storage unit, which correspondingly stores a third boost supply voltage; and
a third discharging path unit, turned on in a third discharging period for serially connecting the third boost storage unit and the first gold capacitor unit between the first output node and the reference voltage, to provide the power signal for driving the first load device according to the first internal storage voltage and the third boost supply voltage, wherein,
the third charging period and the third discharging period are non-overlapping.

8. The power supply system according to claim 1, wherein the first discharging path unit further comprises:
a second output node, having the reference voltage;
a sub internal power supply unit, comprising:
a sub gold capacitor unit, for storing a sub internal storage voltage;
a sub boost storage unit;
a sub charging path unit, turned on in the first charging period for providing the sub internal storage voltage to the sub boost storage unit, which correspondingly stores a sub boost supply voltage; and
a sub discharging path unit, turned on in the first discharging period for serially connecting the sub boost storage unit and the first boost storage unit between the second output node and a ground reference voltage, to determine a level of the reference voltage according to the sub internal storage voltage and the first boost supply voltage.

9. The power supply system according to claim 8, wherein the second output node is further coupled to a second load device and drives the second load device according to the reference voltage.

10. The power supply system according to claim 1, wherein the first boost storage unit selectively comprises either a capacitor circuit or an inductor circuit.

11. The power supply system according to claim 1, wherein first gold capacitor unit is controlled and driven by an external power circuit to store the first internal storage voltage, and the external power circuit comprises:
a charging unit, for providing an external supply voltage; and
a gas gauge integrated circuit, coupled to the charging unit and the first internal power supply unit, for charging the first gold capacitor unit, which correspondingly has the internal storage voltage;
wherein, the gas gauge integrated circuit further measures a voltage and a current of the first gold capacitor unit.

* * * * *